United States Patent Office 3,326,910
Patented June 20, 1967

3,326,910
AMORPHOUS AMINE SILICATES SUBSTANTIALLY FREE OF ALKALI METAL OXIDE AND PROCESS FOR THEIR PREPARATION
Helmut Hans Wilhelm Weldes, Havertown, Pa., assignor to Philadelphia Quartz Company, Philadelphia, Pa., a corporation of Pennsylvania
No Drawing. Filed Aug. 16, 1963, Ser. No. 302,712
10 Claims. (Cl. 260—247)

This invention generally relates to certain organic silicates and their method of preparation. More specifically, this invention relates to amine silicates which are substantially free of alkali metal ions, and their method of preparation.

Very broadly, the present invention pertains to amine silicates produced from water soluble amines. These water soluble amines are ordinarily aliphatic amines containing up to 20 carbon atoms. However, the water soluble amine may also be an alicyclic amine, such as cyclohexylamine.

Considered from one specific aspect, the present invention concerns amine silicates of the formula $$(NHR_1R_2R_3)_2O:xSiO_2$$

wherein $R_1$ and $R_2$ are selected from the group consisting of hydrogen, alkyl, and alkanol groups having between 1 and 20 carbon atoms (and preferably between 1 and 6 carbon atoms); $R_3$ is an alkyl or alkanol group having 1–20 carbon atoms (and preferably 1–6 carbon atoms) and $x$ is a value between about 3 and about 32; said silicates being substantially free of alkali metal ions. By "substantially free of alkali metal ions" is meant less than about 1% by weight of sodium calculated as $Na_2O$.

The amine silicates in accordance with this invention can be prepared in a rather simple and straight-forward manner. For example, aqueous solutions of my amine silicates may be prepared by:

(a) Introducing an aqueous alkali metal silicate solution into a reaction zone, the particle sizes of the micelles and ions in the silicate solution being less than 5 millimicrons and preferably less than 3 millimicrons, (b) Admixing a water soluble amine with said alkali metal silicate, (c) The amount of alkali metal silicate in said admixture being less than 6% by weight calculated on the basis of $SiO_2$ content, (d) Allowing said alkali metal silicate to react with said water soluble amine in said reaction zone so as to produce an aqueous solution of an amine silicate containing alkali metal ions, (e) Treating said aqueous solution of amine silicate containing alkali metal ions with ion exchange resins in order to substantially remove said alkali metal ions from said solution, and (f) Recovering an amine silicate solution substantially free from alkali metal ions.

(a)

The alkali metal silicates which are useful in accordance with this invention include sodium silicates having a wide permissible range of $Na_2O:SiO_2$. Preferred sodium silicates are those commercially available silicates having a $Na_2O:SiO_2$ range of about 1:1 to 1:4. The concentration, specific gravity, viscosity, pH, etc., may vary over a wide range and the ranges encountered in commercial products are satisfactory. The particle sizes of the micelles and ions in the silicate solutions are less than 5 millimicrons and preferably less than 3 millimicrons.

(b)

The water soluble amines which are suitable in accordance with this invention are those having the general formula $NR_1R_2R_3$, wherein $R_1$, $R_2$ and $R_3$ have the meanings set forth earlier in this specification. More particularly, suitable amines include mono-, di-, or tri-methylamine; mono-, di-, or tri-ethylamine; mono-, di-, or tri-isopropylamine; mono-, di-, or tri-isobutylamine; mono- or di-n-propylamine; n-mono-butylamine; n, secondary, iso-, or tertiary monoamylamine; or amines with combinations of the foregoing substituents; diethanol-phenylamine; monocyclopropylamine; mono-, di-, or tri-ethanolamine; morpholine; pyrazine; piperazine; pyridine; pyrrolidine; and meta-phenylene di-amine. The reaction products of ethylene oxide and ammonia or other amines (to form for instance ethanolamines and hydroxylamines) are quite suitable as water soluble amines. From the standpoint of availability and/or cost, triethanolamine, diethanolamine, monoethanolamine, morpholine, cyclohexylamine, and diethylamine, are preferred.

(c)

The amount of alkali metal silicate in said admixture should not exceed about 6% by weight (calculated on the basis of $SiO_2$ content). When the amount exceeds about 6% the admixture of the silicate and amine will ordinarily be found to be too viscous and trouble can develop with the ion exchange resins. It is to be noted that since this invention involves working with very active silicate ions and micelles rather than densified sol particles, if the concentration of the very active ions and micelles is too high they will react with the amine and form a gel covering the resin structure and preventing the base exchange process.

It is believed worthwhile to point out here that the micelles and ions in the silicate solutions are very much less than 5 millimicrons and indeed much less than even 3 millimicrons. They are not in the truly colloidal range. In fact, if one tries to carry out this reaction with silica sols rather than sodium silicates an entirely different product is obtained. For instance, when the reaction is carried out using a silica sol, the dried reaction product is very readily redispersed—whereas the product of the present invention is not readily redispersed in water.

(d)

The reaction between the alkali metal silicate and the amine proceeds rapidly and although the reactants are preferably added together slowly, it is generally preferable to vigorously agitate the reactants together. The reaction proceeds well at room temperature.

(e)

The aqueous solution of amine silicate containing alkali metal ions is next treated with ion exchange resins in order to substantially remove the alkali metal ions from the solution.

The resin polymer I have found most suitable is a highly cross-linked nuclear sulfonic acid type cation exchanger. In order to use this base exchange resin, I treat it with the required water soluble amine in order to prevent the undue loss of amine from the solution while removing the alkali metal ion. When there is a high ratio of silica in the solution, there is then necessarily relatively less amine, and a resin with a lower loading of amine will suffice. However, when the ratio of silica is low with reference to the amine, then the amine is relatively high and the protective loading of amine or ammonia on the resin must be increased. In this latter case, when the ratio of silica is low the silica is present as small, active particles which are especially susceptible to gelation.

(f)

The amine silicate solution that has been substantially freed from alkali metal ions may be processed or used in different ways. First of all, the resulting aqueous solution of substantially alkali metal-free amine silicate may be concentrated to any desired degree, and although the solutions are quite stable as prepared, the stability of the higher concentrations may be increased by heating them. The particle sizes are lower than those found in concentrated silica sols. When concentrated to dryness there remains an amorphous solid having a molecular ratio of $SiO_2$ to amine oxide radical varying from about 3 to approximately 32. The dried product does not readily redissolve.

In addition to the usual applications of alkali metal-free organic alkali silicates in cements, in refractory ceramic products, in liquid detergents, etc. they can be used as intermediates in the preparation of alkali-free quaternary ammonium silicates (e.g. by reaction with ethylene oxide) which are otherwise difficult to free from the last traces of alkali ion when made directly from alkali silicate, such as sodium silicate.

THE EXAMPLES IN GENERAL

The following examples are illustrative of some preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric unless otherwise indicated.

The formula $N(ROH)_3$ in the examples has been used as a shorthand expression for the formula $N(C_2H_4OH)_3$ and therefore throughout the examples the letter R should be understood to stand for $—C_2H_4—$.

The analytical procedure adopted, because the colloidal silica otherwise produces a strongly fading endpoint, was the volumetric method described in American Chemical Society Monograph #116, "Soluble Silicates," by James G. Vail, volume I, pages 40–41. The silica was first converted to the ionic form by treatment with a known amount of excess caustic soda.

Example 1

517 grams of a sodium silicate sold by the Philadelphia Quartz Co., under the name of "S35" (having a weight percent ratio of $Na_2O$ to $SiO_2$ of 1:3.75 and containing 25.3% $SiO_2$) were mixed with 165 grams of water, and to this were added slowly but with vigorous agitation 114 grams of triethanolamine $N(ROH)_3$. This material was obtained from Fisher Scientific Co. and was made according to the specification of the National Formulary. Since a heavy coacervate formed with this mixture, an additional 796 grams of water were added and mixed for 30 minutes during which time the coacervate redissolved. The final solution had a pH of 11.10 compared with a pH of 11.20 for the initial sodium silicate solution. The final solution contained 2.21% $Na_2O$, 7.62% $N(ROH)_3$, 8.52% $SiO_2$, and had a mole ratio of

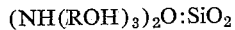

of 1:0.70:3.88, and a mole ratio of

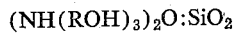

of 1:5.56.

An aliquot portion of this solution was treated with Amberlite IR–124 resin with 50% of the hydrogen replaced by $(NH(ROH)_3)^+$. Amberlite IR–124 resin is a highly cross-linked polystyrene nuclear sulfonic acid type cation exchanger made by the Rohm & Haas Co. in the $Na^+$ form. The sodium form has an exchange capacity of 2.1 milliequivalents (meq.) per milliliter (ml.) of wet resin. 600 ml. of the resin in the sodium form were treated with 2000 ml. of 2 N HCl with slow agitation for one day. It was then washed with distilled water until free of Cl ions. Later tests showed that this reaction with acid is completed in less than an hour.

To obtain a 50% loading, 85 ml. of the resin in the hydrogen form were treated with a solution containing 13.26 grams of $N(ROH)_3$ and 8.66 grams ofg 37.5% hydrochloric acid solution with 113 ml. of water (a solution of $[NH(C_2H_4OH)_3]Cl$). The amount of water is not critical and may be varied up or down considerably without changing the desired loading of the resin. The mixture of the resin in the hydrogen form and the amine solution were agitated gently overnight. Later tests showed that a reaction time of less than 15 minutes was adequate. The resin was then filtered off and washed with distilled water until the filtrate was free of chloride ions.

The amount of alkali ion removed by the treated resin is a function of time and relative concentrations. When 20 grams of the triethanolamine silicate solution were treated for 6 minutes with 10 ml. of the 50% $(NH(ROH)_3)^+$-loaded resin, there remained 0.45% of $Na_2O$, 7.33% of $N(ROH)_3$ and 6.99% of $SiO_2$ having a mole ratio of 4.74 $SiO_2/(NH(ROH)_3)_2O$ and a pH of 10.50. If, on the other hand, 14 ml. of the resin were used with an exchange time of 6 minutes, only 0.16% $Na_2O$ remained with 5.83% of $N(ROH)_3$ and 6.41% of $SiO_2$, or a ratio of 5.46 moles of $SiO_2$ to 1 of $(NH(ROH)_3)_2O$. This had a pH of 9.69 and gelled in one hour but redissolved overnight and was then stable but fairly viscous.

In a larger scale test 714 grams of the triethanolamine silicate solution were mixed with 500 ml. of the above resin for 6 minutes. It gave a product with 0.15% of $Na_2O$, 5.50% $N(ROH)_3$ and 6.23% of $SiO_2$ with a mole ratio of 5.64 $SiO_2$ to 1 $(NH(ROH)_3)_2O$ and a pH of 9.60. Approximately half of this mixture weighing 519.7 grams was concentrated at 60 millimeters of mercury and 60° C. by the removal of 123.2 grams of water and then was heated at 95° C. overnight in a closed container. The final pH of the concentrated solution was 10.31 and the viscosity was 25 cp. at 25.5° C. These values were stable and the concentrated stable solution contained 9.94% of $SiO_2$ and 10.29% of total titratable alkali calculated as $N(ROH)_3$ or a mole ratio of 4.8 $SiO_2$ to 1 $(NH(ROH)_3)_2O$ with the recognition, however, that there still remains 0.24% of $Na_2O$ in the mixture. The solution remained stable for over five months.

The other portion of this large treated mixture weighing 335 grams was treated with 6.3 grams of ethylene oxide (13.5% excess over the stoichiometric conversion to $N(ROH)_4^+$). The temperature was held at 28 to 30° C. and the reaction mixture was stored in a closed vessel at room temperature overnight and then further concentrated at reduced pressure until 165.4 grams of water had been removed. This concentrated solution contained 11.83% of $SiO_2$ and 15.4% total titratable alkali calculated as $N(ROH)_4^+$ (tetraethanolammonium ion). The mole ratio was 5.0 $SiO_2$ to $1(N(ROH)_4)_2O$, with the provisio that there still remained 0.28% $Na_2O$. The pH of this solution was 10.70 and it had a viscosity of 70 cp. at 25.5° C.

Potentiometric titration of these two solutions showed that the triethanolamine silicate was a relatively pure material containing only very small amounts of $Na_2O$ as indicated by the slight angle of the curve at a pH of about 9. By treatment with ethylene oxide, 42% of the $N(ROH)_3$ was converted to $N(ROH)_4^+$ as was also shown by a potentiometric titration.

It was found that when triethanolamine silicate solutions of approximately this ratio were concentrated in vacuo at 60 to 65° C. the solution became very viscous at about 9% $SiO_2$. If, however, it is then heated for a considerable time, as overnight, in a closed vessel at 95° C. it becomes quite fluid and may be further concentrated to from 20 to 25% $SiO_2$ with a low viscosity.

Changing the concentration of the triethanolamine-sodium silicate reaction mixture so that the $SiO_2$ content varied from 8.5 to 2.8% did not change the residual $Na_2O$ when using a standard 14 ml. of treated resin with 20 ml. of the amine silicate reaction mixture with an exchange time of 6 minutes. Increasing the relative amount of resin to 20 ml. with the same amount of time did decrease the $Na_2O$ to 0.03% but at the same time decreased the $N(ROH)_3$ content to about half raising the $SiO_2/(NH(ROH)_3)_2O$ ratio to 11.64. If the silicate reaction mixture is diluted the final ratio may be raised up to 20.8 or more, as an example.

Triethanolamine silicate having a ratio of $$6.2SiO_2:(NH(ROH)_3)_2O$$

concentrated to 20.35% $SiO_2$ was stable in a closed glass bottle for over three and a half months. It had a viscosity of 1.68 poises at 27° C. and a density of 21.4° Baumé at 20° C. The pH was 10.25. When evaporated to dryness at 40° C. and ground to a fine powder, it was found to contain 40.6% $N(ROH)_3$, 50.9% $SiO_2$, 1.05% $Na_2O$ and 7.45% water. The solid material when treated with either hot or cold water did not dissolve except to make the water slightly alkaline.

*Example 2*

A triethanolamine silicate solution having a mole ratio of $SiO_2$ to $(NH(ROH)_3)_2O$ of 5.68 before treatment was treated for 6 minutes with the same Amberlite IR–124 resin with the hydrogen form transformed to 50% in the $NH_3$ form by treatment with ammonia and similarly with a 25% ammonia loaded resin. With the 50% $NH_3$ loaded resin, 10 ml. allowed to react 6 minutes with 20 ml. of the reaction solution left only about 0.23% of $Na_2O$ and increasing amounts of the resin reduced the $Na_2O$ residue but at the same time reduced the $N(ROH)_3$. Much the same experience was had with the 25% ammonia loaded resin. This indicated that a 75% ammonia resin would be more satisfactory. With a 75% ammonia loaded resin, 11 ml. of the resin and 20 grams of the sodium silicate triethanolamine reaction mixture containing 1.71% of $Na_2O$, 5.58% $N(ROH)_3$ and 6.40% of $SiO_2$ allowed to exchange for 6 minutes removed up to 90% of the $Na_2O$ without changing the

ratio.

*Example 3*

Another reaction mixture was made up using the same "S35" sodium silicate and triethanolamine forming a reaction mixture containing 1.73% of $Na_2O$, 1.79% of $N(ROH)_3$ and 6.49% of $SiO_2$, thus having a mole ratio of 18 $SiO_2$ to 1 $(NH(ROH)_3)_2O$. This could be treated adequately with a 50% ammonia loaded resin. The optimum condition was 10.5 ml. of the 50% ammonia loaded resin with 20 grams of the sodium silicate triethanolamine reaction mixture and an exchange time of 6 minutes. The product contained 0.22% $Na_2O$, 1.85% of $N(ROH)_3$ and 6.46% of $SiO_2$ having a mole ratio of 17.4 $SiO_2/(NH(ROH)_3)_2O$ and a pH of 9.82.

*Example 4*

In this example the reaction mixture of sodium silicate and triethanolamine having a mole ratio of

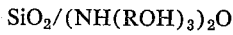

of 18.0 was treated as before using 20 grams of the reaction mixture and 10.5 ml. of 50% ammonia loaded resin for 6 minutes. In this case, the final $Na_2O$ was 0.29%, $N(ROH)_3$ 3.78%, and $SiO_2$ 6.44%, and a mole ratio of 8.4 $SiO_2/(NH(ROH)_3)_2O$. The mixture also contained 0.27% $NH_3$ indicating that some ammonium ion was exchanged into the solution which caused the decrease in ratio (increase in $N(ROH)_3$ calculated from total titratable alkali). In this case 489 grams of the "S35" silicate, 34.2 grams of triethanolamine, and 1381.8 grams of water constituted the reaction mixture treated with 1000 ml. of resin pulled dry on a filter.

The reaction product was mixed with 49.1 grams of ethylene oxide to convert the free ammonia to triethanolamine. After treatment overnight in a closed container the pH was 10.85.

Similarly, this 18.0 $SiO_2/(NH(ROH)_3)_2O$ ratio reaction mixture was treated with 9.25 ml. of 30% $N(ROH)_3$-loaded resin, to 23.6 grams of the reaction mixture having a concentration of 5.5% $SiO_2$. The final mixture contained 0.07% $Na_2O$, 0.96% $NH(ROH)_3$, 5.32% $SiO_2$ with a $SiO_2/(NH(ROH)_3)_2O$ ratio of 27.8. Thus the use of 50% $N(ROH)_3$-loaded resin would have been preferable.

*Example 5*

A tetraethanolammonium silicate prepared by removal of the sodium ion was found by light scattering measurements to have particle sizes much smaller than those of LUDOX SM (mentioned previously) which has a particle size of about 7 mu. Such colloidal silica solutions can be concentrated considerably without gelation. However, the triethanolamine silicate solution prepared by reaction with the sodium silicate and subsequent removal of sodium ion could not be readily concentrated unless heat-treated.

When these solutions were heated at temperatures ranging from 50 to 125° C. for 2 hours or more, light scattering tests indicated that the particle size had been increased and the triethanolamine silicate solutions could be concentrated by evaporation. However, after two hours at 125° C. the triethanolamine silicate solutions still have smaller particle sizes than those of the LUDOX SM, the particle size of LUDOX SM being 7 millimicrons or larger.

*Example 6*

A stable mixture is obtained by adding a solution of 157.5 g. of $N(ROH)_3$ in 700 g. of water to a vigorously agitated solution of 500 g. "S35" sodium silicate in 1452.5 g. of water. The final mixture showed neither floc nor coacervate formation and contained 6.0% $SiO_2$, 1.60% $Na_2O$ and 7.47% $N(ROH)_3$. This solution had a ratio of $SiO_2/(NH(ROH)_3)_2O$ of approximately 4.0. Sodium was removed readily by ion exchange both with 50% and 75% $N(ROH)_3$-loaded resin. While a little less of a 50% loaded resin was needed, the best result was obtained using 13 ml. of 75% $N(ROH)_3$-loaded Amberlite IR–124 and 20 grams of a starting material wherein the mole ratio of $SiO_2$ to $Na_2O$ was 3.89 and the mole ratio of $SiO_2$ to $(NH(ROH)_3)_2O$ was 4.0. An exchange time of 6 minutes was used.

The resulting solution gelled in 20 minutes after removal of the resin but redissolved within a few hours and became very thin. It contained 0.07% $Na_2O$, 6.36% $N(ROH)_3$, 5.79% $SiO_2$ and had a mole ratio of 85.5 $SiO_2/Na_2O$ and 4.5 $SiO_2/(NH(ROH)_3)_2O$.

*Example 7*

A triethanolamine silicate solution with a mole ratio of about 32.0 $SiO_2/(NH(ROH)_3)_2O$ was prepared by using 8 ml. of an 18.75% $N(ROH)_3$-loaded resin with 20 grams of a solution containing 1.66% $Na_2O$, 0.97% $N(ROH)_3$, 6.21% $SiO_2$ and a mole ratio of $SiO_2$ to $Na_2O$ of 3.87 and $SiO_2$ to $(NH(ROH)_3)_2O$ of 32.0. The exchange time was 6 minutes, as usual. This solution also gelled in 15 minutes after removal of the resin but redissolved in a few hours and became very thin. This final solution contained 0.15% $Na_2O$ and 0.87% $N(ROH)_3$ with 6.08% $SiO_2$. Mole ratios were 41.9 $SiO_2/Na_2O$ and 34.8 $SiO_2/(NH(ROH)_3)_2O$. The starting solution was prepared by dissolving 39.3 grams of triethanolamine in 1000 grams of "S35" sodium silicate diluted with 1000 grams of water.

Example 8

In this example a 5.58 mole ratio of $$SiO_2/(NH(ROH)_3)_2O$$

triethanolamine solution was prepared from ammonia and ethylene oxide in a sodium silicate solution with the sodium removed by ion exchange. 800 grams of "S35" sodium silicate were diluted with 900 grams of water in a 3 liter triple neck flask equipped with a stirrer, an inside thermometer, a low temperature reflux condenser and a gas inlet tube. To this mixture 71.2 grams and 29% ammonia solution were added. While this mixture was agitated, 176 grams of ethylene oxide was introduced into the flask. This represents an excess of 10%. During the course of this addition the temperature was maintained at 26° to 30° C. in the solution. All of the ethylene oxide was introduced within 50 minutes and during this time a heavy coacervate formed. Cooling was continued for 2 hours after which no more cooling was required and most of the coacervate had dissolved. The mixture was kept in a closed vessel at room temperature overnight and then a small amount of undissolved floc was filtered off. The final solution contained 2.77% of $Na_2O$, 9.26% of $N(ROH)_3$, 10.39% of $SiO_2$ and had mole ratios of $SiO_2/Na_2O$ of 3.75 and $SiO_2/(NH(ROH)_3)_2O$ of 5.56. The mixture was diluted to 6.00% $SiO_2$ by the addition of 1464.1 grams of water. Then using 12 ml. 50% $N(ROH)_3$-loaded resin with 20 grams of the above solution and an exchange time of 6 minutes a substantially sodium-free solution of triethanolamine silicate was obtained with the following compositions: 0.26% $Na_2O$, 6.51% $N(ROH)_3$, 7.66% $SiO_2$, and a mole ratio of $SiO_2/Na_2O$ of 30.5 and $SiO_2/(NH(ROH)_3)_2O$ of 5.84.

Example 9

These aqueous solutions of triethanolamine silicates may be concentrated to form stable solutions. For instance, using a triethanolamine silicate solution having a mole ratio of 18 $SiO_2/(NH(ROH)_3)_2O$ with a low viscosity it was found on concentrating to 10% at about 45 to 50° C. that the solution first became very viscous after standing but when heated in a closed vessel at 125° C. for 20 hours it became quite thin with a viscosity of 15 cp. at 25° C. and a pH of 10.0 This was stable for more than a month. Another portion of the original solution heated at 125° C. overnight before it was concentrated was then evaporated in vacuo to 33.7% $SiO_2$. Whereas the original heated solution had a viscosity of 1.45 poises at 25° C. and a pH of 9.6, the concentrated solution containing 33.7% $SiO_2$ was very viscous and was, therefore, diluted to 30% $SiO_2$ with water to give a viscosity of 8.7 poises. This was then stable for 3 weeks but set to a solid gel in about 4 weeks.

Example 10

Monoethanolamine silicate was prepared from a starting solution made by diluting 250 g. "S35" sodium silicate (6.75% $Na_2O$, 25.3% $SiO_2$), with 500 g. of water. To this vigorously agitated solution was added a solution of 23.1 g. monoethanolamine (from Eastman Kodak Co.) in 281.9 g. of water. A slightly hazy, stable solution was obtained containing 1.60% $Na_2O$, 2.19% monoethanolamine ($NH_2ROH$), 6.00% $SiO_2$, mole ratio $SiO_2/Na_2O$ of 3.75, $SiO_2/(NH_3ROH)_2O$ of 5.56.

A 50% monoethanolamine loaded Amberlite IR-124 resin was prepared by treating 300 ml. of the resin in the hydrogen form with a solution of 19.2 g. monoethanolamine and 30.7 g. hydrochloric acid solution (37.5%) in 500 ml. of water. After the treated resin was washed free of chloride ions it was used to prepare different ratio monoethanolamine silicate solutions. Thus, a six-minute treatment of 60 g. of the above starting solution with 30, 35, 40 and 45 ml. of the resin gave the following stable monoethanolamine silicate solutions:

| Amount of Resin | Mole Ratios | | Percent | | |
|---|---|---|---|---|---|
| | $SiO_2/(NH_3ROH)_2O$ | $SiO_2/Na_2O$ | $Na_2O$ | $NH_2ROH$ | $SiO_2$ |
| 30 ml | 7.24 | 21.3 | 0.28 | 1.62 | 5.77 |
| 35 ml | 9.88 | 26.7 | 0.22 | 1.17 | 5.68 |
| 40 ml | 11.88 | 53.7 | 0.11 | 0.98 | 5.72 |
| 45 ml | 23.70 | 59.2 | 0.10 | 0.49 | 5.72 |

The first reaction (30 ml. resin) was repeated on a scale about seven times as large with virtually the same result. A portion of this solution was heated at 125° C. for 16 hours in a closed vessel and then concentrated in vacuo to about 10% $SiO_2$ content. This was a stable, slightly turbid, water-thin solution.

Example 11

Diethanolamine silicate was prepared from a starting solution made by diluting 250 g. "S35" sodium silicate with 500 g. of water and adding to the vigorously agitated mixture a solution of 39.8 g. diethanolamine (from Union Carbide Chemicals Co.) in 265.2 g. of water. A slightly hazy, stable solution was obtained containing 1.60% $Na_2O$, 3.77% diethanolamine ($NH(ROH)_2$), mole ratio $SiO_2/Na_2O$ of 3.75, mole ratio $SiO_2/(NH_2(ROH)_2)_2O$ of 5.56.

A 50% diethanolamine loaded resin was prepared in the usual way by treating 300 ml. of Amberlite IR-124 in the hydrogen form with a solution of 33.1 g. $NH(ROH)_2$ and 30.7 g. hydrochloric acid (37.5%) in 500 ml. water. Different ratio diethanolamine silicate solutions were prepared by treating 60 g. of the above starting solution with 40, 42, and 45 ml. of the resin for six minutes.

This gave the following stable silicate solutions:

| Amount of Resin | Mole Ratios | | Percent | | |
|---|---|---|---|---|---|
| | $SiO_2/(NH_2(ROH)_2)_2O$ | $SiO_2/Na_2O$ | $Na_2O$ | $NH(ROH)_2$ | $SiO_2$ |
| 40 ml | 12.00 | 67.8 | 0.09 | 1.72 | 5.90 |
| 42 ml | 15.18 | 73.6 | 0.08 | 1.31 | 5.69 |
| 45 ml | 18.40 | 298.0 | 0.02 | 1.10 | 5.78 |

The last reaction (45 ml. resin) was repeated on a scale about seven times as large with virtually the same result.

Example 12

Morpholine silicate was prepared from a starting solution made by diluting 250 g. "S35" sodium silicate with 500 g. of water. To the vigorously agitated solution was added a solution of 33.0 g. morpholine (from Union Carbide Chemicals Co.) in 272 g. of water to give a slightly hazy, stable solution containing 1.60% $Na_2O$, 3.12% morpholine, 6.00% $SiO_2$, mole ratio $SiO_2/Na_2O$ of 3.75, mole ratio $SiO_2$/morpholine oxide of 5.56. (Morpholine is a tetraethanolammonium hydroxide in which 2 OH groups have condensed with loss of water and is also sometimes referred to as tetrahydro-1,4-oxazine.)

A 50% morpholine loaded resin was prepared from 300 ml. of Amberlite IR-124 in the hydrogen form and a solution of 27.4 g. morpholine and 30.7 g. hydrochloric acid (37.5%) in 500 ml. of water. Different ratio morpholine silicates were prepared by treating 60 g. of the above starting solution with 40 and 45 ml. of the resin for 6 minutes. This gave the following stable silicate solution:

| Amount of Resin | Mole Ratio | | Percent | | |
|---|---|---|---|---|---|
| | $SiO_2$/Morph. oxide | $SiO_2$/$Na_2O$ | $Na_2O$ | Morpholine | $SiO_2$ |
| 40 ml | 10.22 | 67.0 | 0.09 | 1.65 | 5.89 |
| 45 ml | 16.14 | 87.1 | 0.07 | 1.06 | 5.91 |

The last reaction (45 ml. resin) was repeated on a scale seven times as large giving virtually the same result.

*Example 13*

Diethylamine silicate was prepared from a starting solution made by diluting 250 g. "S35" sodium silicate (6.75% $Na_2O$, 25.3% $SiO_2$) with 500 g. of water. To this vigorously agitated solution was added a solution of 37.7 g. diethylamine (from Fisher Scientific Co.) in 267.3 g. of water. A slightly hazy, stable solution was obtained containing 1.60% $Na_2O$, 3.58% diethylamine ($Et_2NH$), 6.00% $SiO_2$, mole ratio $SiO_2/Na_2O$ of 3.75, $SiO_2/(Et_2NH_2)_2O$ of 4.08.

A 50% diethylamine loaded Amberlite IR-124 resin was prepared by treating 200 ml. of the resin in the hydrogen form with a solution of 15.4 g. diethylamine and 20.5 g. hydrochloric acid solution (37.5% HCl) in 500 ml. of water. After the treated resin was washed free of chloride ions it was used to prepare different ratio diethylamine silicate solutions. Thus, a six-minute treatment of 20 g. of the above starting solution with 16 and 17 ml. of the resin gave the following stable diethylamine silicate solutions:

| Amount of Resin | Mole Ratios | | Percent | | |
|---|---|---|---|---|---|
| | $SiO_2$/$(Et_2NH_2)_2O$ | $SiO_2$/$Na_2O$ | $Na_2O$ | $Et_2NH$ | $SiO_2$ |
| 16 ml | 14.38 | 39.5 | 0.15 | 0.97 | 5.74 |
| 17 ml | 19.66 | 74.1 | 0.08 | 0.71 | 5.74 |

A second series of tests was made using a 75% diethylamine loaded Amberlite IR-124 resin with the same starting solution. The 75% diethylamine loaded Amberlite IR-124 resin was prepared by treating 200 ml. of the resin in the hydrogen form with a solution of 23.0 g. diethylamine and 30.6 g. hydrochloric acid solution (37.5% HCl) in 500 ml. of water. The treated resin was washed free of chloride ions and then used to prepare different ratio diethylamine silicate solutions. Thus a six-minute treatment of 20 g. of the starting solution with 17 and 18 ml. of the 75% loaded resin gave the following stable diethylamine silicate solutions:

| Amount of Resin | Mole Ratios | | Percent | | |
|---|---|---|---|---|---|
| | $SiO_2$/$(Et_2NH_2)_2O$ | $SiO_2$/$Na_2O$ | $Na_2O$ | $Et_2NH$ | $SiO_2$ |
| 17 ml | 9.36 | 36.3 | 0.16 | 1.51 | 5.81 |
| 18 ml | 14.56 | 60.0 | 0.10 | 0.97 | 5.81 |

*Example 14*

A sodium-free triethanolamine silicate having the composition 20.0% $SiO_2$, 0.65% $Na_2O$, 6.26% $NR_3$, and having an $SiO_2$ to tertiary amine oxide ratio of about 15.88 was mixed with iron oxide and talc in the proportions of 20 ml. of the silicate solution (containing 4.6 grams of $SiO_2$), 3.5 grams of iron oxide and 3.5 grams of talc. Lead oxide was added to the coating mixtures and the total mixtures ball milled for two hours. Three compositions were prepared, one containing 0.5 gram, the second containing 1.0 gram and the third containing 1.5 grams of the lead oxide. Mixtures containing 2 grams of lead oxide gelled on the ball mill and were not used. The mixture with 1.5 grams gelled in one hour and was quite viscous. However, it was possible to make a coating. The mixture with 1 gram of lead oxide was only slightly viscous after ball milling and gelled in five hours. The first mixture with 0.5 gram of lead oxide was stable and made a very good coating. Only this latter coating could not be rubbed off before and after boiling the asbestos-cement shingle on which the coating was applied. Actually, I found that approximately the same amount of lead oxide based on the silica present, i.e. 11–15%, was required as was needed for a tetraethanolammonium silicate.

Light scattering tests show that there is a wide variation in the particle size between silica sols, such as Ludox SM, mixtures of Ludox and triethanolamine, tetraethanolammonium silicates and triethanolamine silicates. The mixture of triethanolamine with Ludox forms a somewhat larger particle size than the original Ludox. The particle size of both triethanolamine silicate and the tetraethanolammonium silicate prepared by base exchange is much smaller than that of the colloidal silica.

The used resin may be regenerated with hydrochloric acid and complete recovery of triethanolamine salt and its separation from the sodium salt is obtained in the following way. The acid regeneration solution is evaporated to dryness by distilling off water and excess hydrochloric acid, and the crystalline residue (a mixture of triethanolamine hydrochloride and sodium chloride) is treated with concentrated hydrochloric acid solution (37.5%). The triethanolamine hydrochloride is dissolved quantitatively leaving the sodium chloride as the undissolved residue. The excess hydrochloric acid is removed by distillation and the triethanolamine hydrochloride is then used to reload the resin to the desired level. The combined acid distillation products are used for the regeneration of the spent resin.

I have thus prepared new amine silicates not heretofore known, and they have been prepared by new methods of procedure. These silicates are usually obtained and used in aqueous solutions having mole ratios of from about 3.0 to 32 or more $SiO_2/(NR_3)_2O$.

More or less detailed claims will be presented hereinafter and even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art and still other obvious equivalents could be readily ascertained upon rather simple, routine, noninventive experimentation. Certainly no invention would be involved in substituting one or more of such obvious equivalents for the materials specifically recited in the claims. I intend that all such obvious equivalents be encompassed within the scope of this invention and patent grant in accordance with the well-known doctrine of equivalents, as well as changed proportions of the ingredients which do not render the composition unsuitable for the disclosed purposes.

What is claimed is:

1. A non-crystalline amine silicate of the formula $(NHR_1R_2R_3)_2O:xSiO_2$ wherein $R_1$ and $R_2$ are selected from the group consisting of hydrogen, alkyl, and alkanol groups having between 1 and 20 carbon atoms; $R_3$ is selected from the group consisting of alkyl and alkanol groups having 1–20 carbon atoms; and $x$ is a value above about 4 and below about 28; said silicates containing less than about 1% by weight of sodium calculated as $Na_2O$.

2. A non-crystalline amine silicate according to claim 1 wherein said alkyl and alkanol groups have between 1 and 6 carbon atoms.

3. Substantially alkali metal oxide-free, triethanolamine silicate with a mol ratio of $SiO_2$ to triethanolamine oxide ranging between 3:1 and 32:1.

4. Substantially alkali metal oxide-free morpholine silicate.

5. A method for preparing non-crystalline amine silicates containing less than about 1% by weight of sodium calculated as $Na_2O$, which comprises:
   (a) introducing an aqueous alkali metal silicate solution into a reaction zone, the particle sizes of the micelles and ions in the silicate solution being less than 5 millimicrons and preferably less than 3 millimicrons,
   (b) admixing a water soluble amine with said alkali metal silicate,
   (c) the amount of alkali metal silicate in said admixture being less than 6% by weight calculated on the basis of $SiO_2$ content,
   (d) allowing said alkali metal silicate to react with said water soluble amine in said reaction zone so as to produce an aqueous solution of an amine silicate containing alkali metal ions,
   (e) treating said aqueous solution of amine silicate containing alkali metal ions with cation exchange resins loaded with a member selected from the group consisting of a water soluble amine and ammonia in order to substantially remove said alkali metal ions from said solution, and
   (f) recovering an amine silicate solution substantially free from alkali metal ions.

6. A method according to claim 5 wherein said water-soluble amine has the formula $NR_1R_2R_3$ wherein $R_1$ and $R_2$ are selected from the group consisting of hydrogen, alkyl, and alkanol groups having between 1 and 20 carbon atoms, and $R_3$ is selected from the group consisting of alkyl and alkanol groups having 1–20 carbon atoms.

7. A method according to claim 5 wherein said water soluble amine is triethanolamine.

8. A method according to claim 6 wherein said water soluble amine is monoethanolamine.

9. A method according to claim 6 wherein said water soluble amine is diethanolamine.

10. A method according to claim 6, wherein said water soluble amine is diethylamine.

References Cited
UNITED STATES PATENTS 2,689,245  9/1954  Merrill _____ 260—247

FOREIGN PATENTS 709,634  6/1954  Great Britain.

ALEX MAZEL, *Primary Examiner.*

NICHOLAS S. RIZZO, HENRY R. JILES, *Examiners.*

JOSE TOVAR, *Assistant Examiner.*